US007170697B2

(12) United States Patent
Pate et al.

(10) Patent No.: US 7,170,697 B2
(45) Date of Patent: Jan. 30, 2007

(54) PROGRAMMABLE WAVEFORM FOR LAMP BALLAST

(75) Inventors: Michael A. Pate, Tucson, AZ (US); James R Cole, Albany, OR (US); Peter Guy Howard, Junction City, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 69 days.

(21) Appl. No.: 10/977,303

(22) Filed: Oct. 29, 2004

(65) Prior Publication Data

US 2006/0091824 A1 May 4, 2006

Related U.S. Application Data

(60) Provisional application No. 60/620,861, filed on Oct. 20, 2004.

(51) Int. Cl.
*G02B 41/36* (2006.01)
*G09G 7/00* (2006.01)

(52) U.S. Cl. ........................................ 359/894; 345/32

(58) Field of Classification Search ............. 315/169.1, 315/169.3, 169.4; 345/22, 32, 94, 98, 208; 359/238, 239, 242, 894
See application file for complete search history.

(56) References Cited

U.S. PATENT DOCUMENTS

| | | | | |
|---|---|---|---|---|
| 5,363,020 | A * | 11/1994 | Chen et al. | 315/209 R |
| 5,706,061 | A * | 1/1998 | Marshall et al. | 348/743 |
| 6,246,185 | B1 * | 6/2001 | Parks | 315/291 |
| 6,535,187 | B1 * | 3/2003 | Wood | 345/84 |
| 6,570,347 | B2 * | 5/2003 | Kastner | 315/307 |
| 6,828,961 | B2 * | 12/2004 | Elliott et al. | 345/213 |
| 6,897,613 | B2 * | 5/2005 | Wada et al. | 313/631 |

* cited by examiner

*Primary Examiner*—Shih-Chao Chen
*Assistant Examiner*—Minh Deu A

(57) ABSTRACT

A programmable waveform ballast has a power supply and a waveform generator. The power supply provides, from a power source, a variable power to a discharge lamp. The waveform generator is coupled to the power supply and is programmable to produce a plurality of waveforms. The waveform generator controls the power supply to apply the variable power to the discharge lamp in accordance with a programmed waveform.

20 Claims, 2 Drawing Sheets

PROGRAMMABLE WAVEFORM FOR LAMP BALLAST

CROSS-REFERENCE TO RELATED APPLICATIONS

This application claims the benefit of U.S. Provisional Application No. 60/620,861, filed on Oct. 20, 2004, entitled PROGRAMMABLE WAVEFORM FOR LAMP BALLAST.

BACKGROUND OF THE INVENTION

A lamp ballast is a current-limiting device used in connection with a fluorescent or other electric-discharge lamp to provide the correct circuit conditions for starting and operating the lamp. The ballast limits the current to the value for which the lamp is designed and provides the required starting voltage when the lamp is switched on. Not all lamps have the same power waveform requirements. Lamps with different waveform requirements have traditionally required the use of different lamp ballasts.

One use for lamp ballasts is in digital projectors. Digital projectors include a lamp ballast compatible with the projector lamp. Often, a lamp ballast from one projector design has a different waveform than a lamp ballast from another projector design. As a result, newly designed projectors frequently require a newly designed lamp ballast with a new waveform.

Designing a lamp ballast with a new waveform traditionally requires a large investment of time and expense. Furthermore, a newly designed lamp ballast is often used for only a few years before the projector for which it was deigned becomes obsolete. As a result, much effort is put into designing lamp ballasts that have only a short useful life.

SUMMARY OF THE INVENTION

According to principles of the present invention, in one embodiment, a programmable waveform ballast has a power supply and a waveform generator. The power supply provides, from a power source, a variable power to a discharge lamp. The waveform generator is coupled to the power supply and is programmable to produce a plurality of waveforms. The waveform generator controls the power supply to apply the variable power to the discharge lamp in accordance with a programmed waveform.

DETAILED DESCRIPTION OF THE INVENTION

Figure 1:
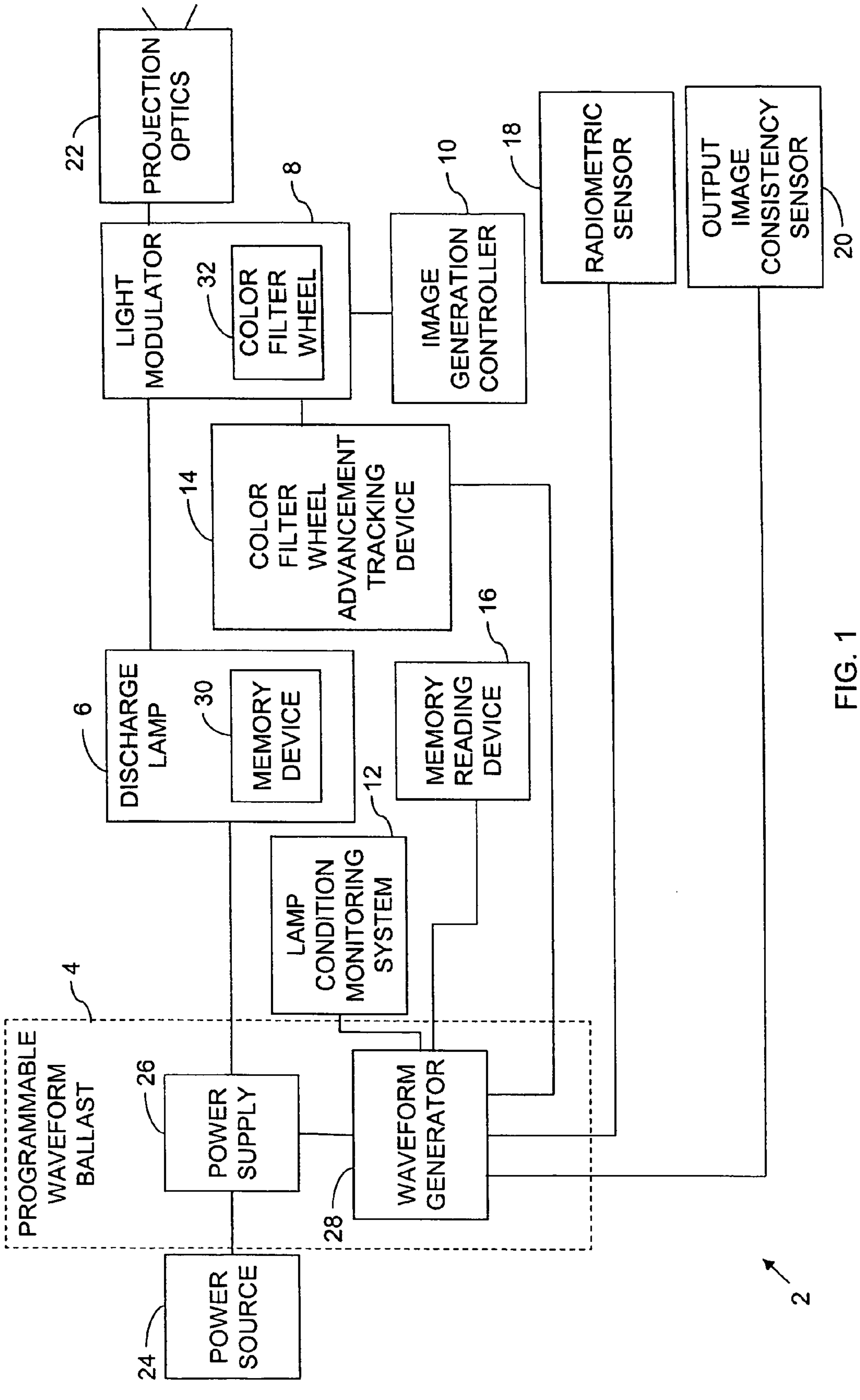
FIG. 1 is a block diagram illustrating one embodiment of the present invention display device.

Illustrated in FIG. 1 is one embodiment of a display device 2 of the present invention. In one embodiment, display device 2 includes programmable waveform ballast 4, discharge lamp 6, light modulator 8, image generation controller 10, lamp condition monitoring system 12, color filter wheel advancement tracking device 14, memory reading device 16, radiometric sensor 18, output image consistency sensor 20, and projection optics 22. Providing electrical power to display device 2 is power source 24. Power source 24 is any source of electrical power.

In one embodiment, programmable waveform ballast 4 includes power supply 26 and waveform generator 28. Power supply 26 draws electrical power from power source 24 to provide variable power to discharge lamp 6. The waveform of the variable power is controlled by waveform generator 28.

Waveform generator 28 is programmable to produce a plurality of waveforms. Waveform generator 28 is coupled to power supply 26 and controls power supply 26 to generate the variable power in accordance with a programmed waveform. In one embodiment, waveform generator 28 is programmable to produce any desired waveform, including alternating current and direct current waveforms.

Discharge lamp 6 is any discharge lamp suitable for use with a ballast. One example of discharge lamp 6 is a high pressure lamp. In one embodiment, discharge lamp 6 includes memory device 30. Memory device 30 stores information describing one or more waveforms with which lamp 6 is compatible. The information may exactly describe the waveforms or may provide parameters for the waveform. Alternatively, the information stored in memory device 30 may be a pointer which indicates the location of waveform parameters located elsewhere. Examples of these parameters include maximum and minimum voltages, maximum and minimum current frequencies, and compatible waveform shapes, such as sinusoidal, square, and saw tooth.

Light modulator 8 is disposed to receive light from discharge lamp 6. Light modulator 8 may be any device or system configured to perform both color and spatial modulation of the light from discharge lamp 6 to form an image. In one embodiment, color modulation of light modulator 8 is performed by color filter wheel 32. Alternatively, color modulation is performed by any other type of light color modulator.

Image generation controller 10 is any combination of hardware and executable code configured to control light modulator 8 to form an image. One example of an image generation controller 10 is a sub-frame generator.

Lamp condition monitoring system 12 is any combination of hardware and executable code configured to monitor conditions of discharge lamp 6. The number of hours discharge lamp 6 has been in use is one example of a condition of discharge lamp 6. In one embodiment, the programmed waveform is programmed as a function of the lamp condition. The waveform is adjusted to accommodate the condition of discharge lamp 6.

Color filter wheel advancement tracking device 14 is any combination of hardware and executable code configured to track the advancement of color filter wheel 8. In implementations of the present invention without color filter wheel 32, color filter wheel advancement tracking device is not used. The function of the programmable waveform does not depend on a color-wheel architecture.

As color filter wheel 8 rotates, different colors of light are produced. Color filter wheel advancement tracking device 14 tracks the advancement of color filter wheel 8 so that the color of light produced may be utilized by waveform generator 28.

In one embodiment, color filter wheel advancement tracking device 14 estimates the position of color filter wheel 8. In another embodiment, color filter wheel advancement tracking device 14 utilizes feedback from color filter wheel 8 to more accurately track the advancement of color filter wheel 8.

In one embodiment, the programmed waveform is programmed as a function of the advancement of color filter wheel 32. This allows programmable ballast 4 to alter the intensity of discharge lamp 6 for different colors resulting from the advancement of color filter wheel 32.

Memory reading device 16 is any combination of hardware and executable code configured to read, from memory device 30 on discharge lamp 6, a waveform for the lamp. In one embodiment, the programmed waveform is programmed to match, or meet the parameters of, the waveform from memory device 30 of discharge lamp 6. This allows for a great deal of flexibility among lamps. If a discharge lamp 6 has a memory device that sets out a waveform for use with the discharge lamp 6, the waveform may be read and programmed into the programmable waveform ballast.

Radiometric sensor 18 is any combination of hardware and executable code configured to sense the radiometric output of display device 2 and provide feedback to waveform generator 28. Radiometric sensor 18 is disposed so that it can sense the radiometric output of display device 2.

In one embodiment, the programmed waveform is programmed as a function of the radiometric output of display device 2. This allows programmable waveform ballast 4 to calibrate the radiometric output to provide enhanced illumination quality, especially in combination with color filter wheel advancement tracking device 14.

Output image consistency sensor 20 is any combination of hardware and executable code configured to sense the radiometric output of display device 2. Output image consistency sensor 20 is disposed so that it can sense the output image consistency of display device 2.

In one embodiment, the programmed waveform is programmed as a function of the output image consistency. This allows programmable waveform ballast 4 to account for inconsistencies in the output image. For example, lamp flicker may result from lamp aging or perhaps from inadequate cooling of the lamp. The flicker may be corrected by the programmable waveform ballast 4 adjusting the phase of the waveform.

Projection optics 22 provide focusing and other optical adjustments, where necessary, for the display of an image by display device 2.

Figure 2:
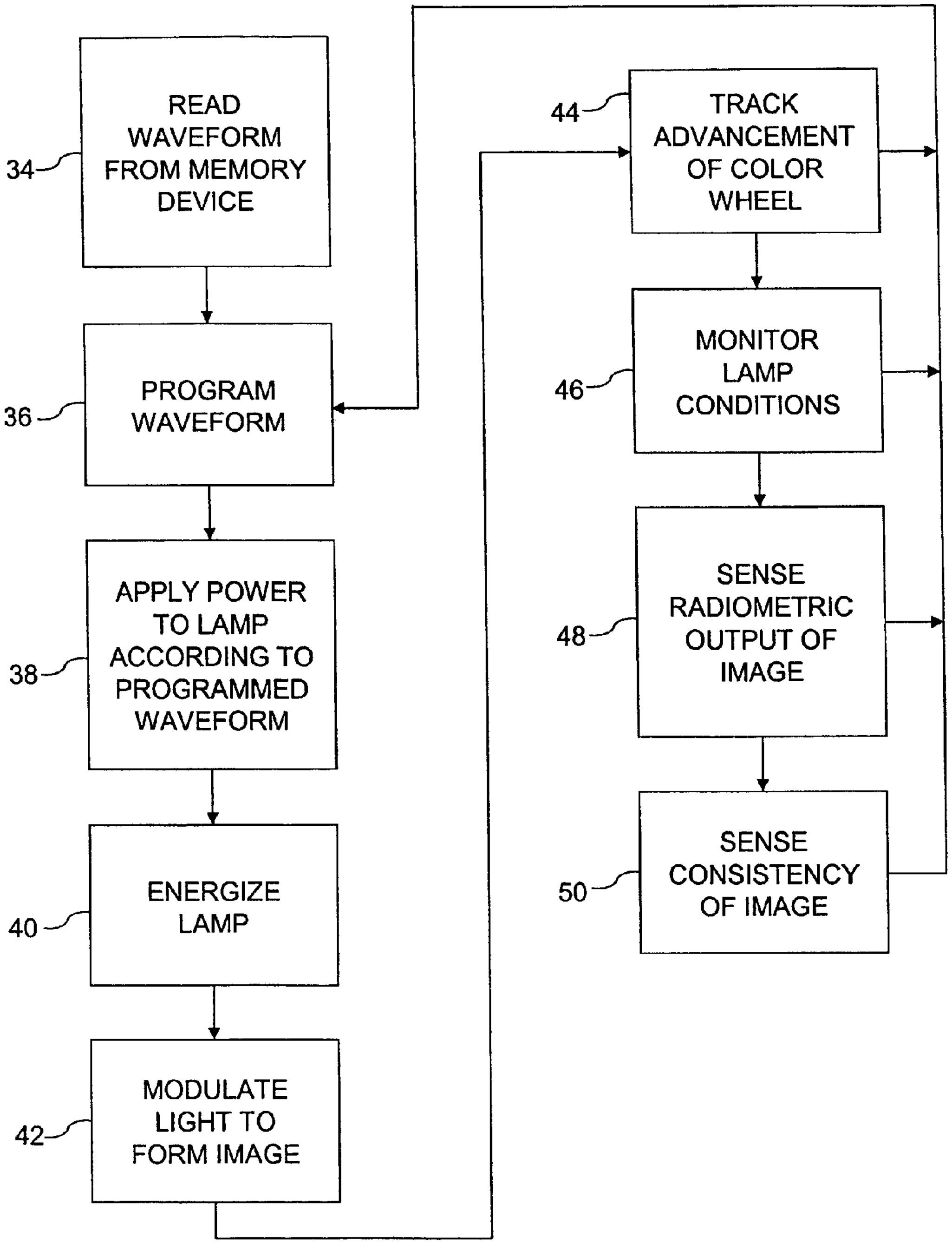
FIG. 2 is a flow chart illustrating one embodiment of the present invention method for controlling a display device.

FIG. 2 is a flow chart representing steps of one embodiment of the present invention. Although the steps represented in FIG. 2 are presented in a specific order, the present invention encompasses variations in the order of steps. Furthermore, additional steps may be executed between the steps illustrated in FIG. 2 without departing from the scope of the present invention.

A waveform is programmed 36 on a waveform generator. In one embodiment, the waveform is programmed by selecting from alternating and direct current waveforms. In other embodiments, the waveform is programmed to take on any desirable shape, such as sinusoidal, square, and saw tooth forms.

In another embodiment, a waveform is first read 34 from a memory device. The memory device may be located on a discharge lamp or any other location. A waveform is then programmed 36 on the waveform generator to match the waveform read 34 from the memory device.

A variable power is provided to the discharge lamp. The variable power is controlled to apply 38 power to discharge lamp 6 in accordance with the programmed waveform.

The discharge lamp is energized 40, with the supplied power, to provide light. The light from the discharge lamp is modulated 42 to form an image. In one embodiment, modulating the light includes color modulating the light with a color filter wheel. In another embodiment, modulating the light includes modulating the light with an interference based or interferometric modulator.

In one embodiment, advancement of the color filter wheel is tracked 44. Feedback is provided to programmable waveform ballast so that the waveform may be programmed as a function of the advancement of color filter wheel 32. An example of this programming is a "red boost" in which the red portion of the lamp spectrum is enhanced. In another example, a broader portion of the spectrum is boosted.

In other embodiments, the intensity, change in the intensity, or the rate of change in intensity of the discharge lamp is monitored 46. Feedback is provided to programmable waveform ballast so that the waveform may be programmed as a function of the condition of the discharge lamp.

In one embodiment, a radiometric output of the image is sensed 48. Feedback is provided to programmable waveform ballast so that the waveform may be programmed as a function of the radiometric output. This output may be sensed at locations where stray light is present, such as between discharge lamp 6 and light modulator 8.

In one embodiment, an output image consistency of the image sensed 50. Feedback is provided to the programmable waveform ballast so that the waveform may be programmed as a function of the output image consistency. By way of this feedback, variations in the output image can be reduced to a level below a human-perceptible level.

The foregoing description is only illustrative of the invention. Various alternatives and modifications can be devised by those skilled in the art without departing from the invention. Accordingly, the present invention embraces all such alternatives, modifications, and variances that fall within the scope of the appended claims.

What is claimed is:

1. A programmable waveform ballast for a discharge lamp, the ballast comprising:

a power supply providing, from a power source, a variable power to the discharge lamp;

a radiometric sensor;

a lamp condition monitoring system coupled to the radiometric sensor and adapted to provide a programmed waveform is programmed as a function of an intensity, a change in the intensity, or the rate of change of the intensity of the discharge lamp condition as monitored by the radiometric sensor; and a waveform generator coupled to the power supply, the waveform generator programmable to produce a plurality of waveforms, the waveform generator controlling the power supply to apply the variable power to the discharge lamp in accordance with the programmed waveform.

2. The programmable waveform ballast of claim 1 wherein the programmed waveform is selectable from alternating and direct current waveforms.

3. A display device comprising:

a discharge lamp;

a light modulator disposed to receive light from the discharge lamp and modulate the light to form an image;

an image generation controller controlling the formation of an image by the light modulator;

a power supply providing, from a power source, a variable power to the discharge lamp;

a radiometric sensor disposed to sense the radiometric output of the display device and wherein a programmed waveform is programmed as a function of the radiometric output; and a waveform generator coupled to the power supply, the waveform generator programmable to produce a plurality of waveforms, the waveform generator controlling the power supply to apply the variable power to the discharge lamp in accordance with the programmed waveform.

4. The display device of claim 3 wherein the programmed waveform is selectable from alternating and direct current waveforms.

5. The display device of claim 3 wherein the light modulator includes a color filter wheel and further including a color filter wheel advancement tracking device and wherein the programmed waveform is programmed as a function of the color filter wheel advancement.

6. The display device of claim 3 further including a memory reading device configured to read, from a memory device on the discharge lamp, a waveform for the discharge lamp and wherein the programmed waveform is programmed to match the waveform from the memory device of the discharge lamp.

7. The display device of claim 3 further including a lamp condition monitoring system and wherein the programmed waveform is programmed as a function of the discharge lamp condition.

8. The display device of claim 3 further including an output image consistency sensor disposed to sense the output image consistency of the display device and wherein the programmed waveform is programmed as a function of the output image consistency.

9. A display device comprising:

a discharge lamp;

means for modulating light from the discharge lamp to form an image;

a power supply providing, from a power source, a variable power to the discharge lamp;

means for producing a plurality of programmed waveforms;

a radiometric sensor disposed to sense the radiometric output of the display device and wherein a programmed waveform is programmed as a function of the radiometric output; and means for controlling the power supply to apply the variable power to the discharge lamp in accordance with the programmed waveform.

10. The display device of claim 9 wherein the programmed waveform is selectable from alternating and direct current waveforms.

11. The display device of claim 9 wherein the means for modulating includes a color filter wheel and further including a color filter wheel advancement tracking device and wherein the programmed waveform is programmed as a function of the color filter wheel advancement.

12. The display device of claim 9 further including a memory reading device configured to read, from a memory device on the discharge lamp, a waveform for the discharge lamp and wherein the programmed waveform is programmed to match the waveform from the memory device of the discharge lamp.

13. The display device of claim 9 further including a lamp condition monitoring system and wherein the programmed waveform is programmed as a function of the discharge lamp condition.

14. The display device of claim 9 further including an output image consistency sensor disposed to sense the radiometric output of the display device and wherein the programmed waveform is programmed as a function of the output image consistency.

15. A method for controlling a display device, the method comprising:

programming a waveform on a waveform generator programmable to produce a plurality of waveforms;

providing, from a power supply, a variable power to a discharge lamp;

controlling the power supply to apply the variable power to the discharge lamp in accordance with the programmed waveform;

energizing the discharge lamp to provide light;

modulating the light from the discharge lamp to form an image; and sensing a radiometric output of the image and wherein programming the waveform includes programming the waveform as a function of the radiometric output.

16. The method of claim 15 wherein programming the waveform includes selecting from alternating and direct current waveforms.

17. The method of claim 15 wherein modulating the light includes color modulating the light with a color filter wheel and further including tracking advancement of the color filter wheel and wherein programming the waveform includes programming the waveform as a function of the color filter wheel advancement.

18. The method of claim 15 further including reading, from a memory device on the discharge lamp, a waveform for the discharge lamp and wherein programming the waveform includes programming the waveform to match the waveform from the memory device of the discharge lamp.

19. The method of claim 15 further including monitoring a lamp condition and wherein programming the waveform includes programming the waveform as a function of the discharge lamp condition.

20. The method of claim 15 further including sensing an output image consistency of the image and wherein programming the waveform includes programming the waveform as a function of the output image consistency.

* * * * *